Figure 1:
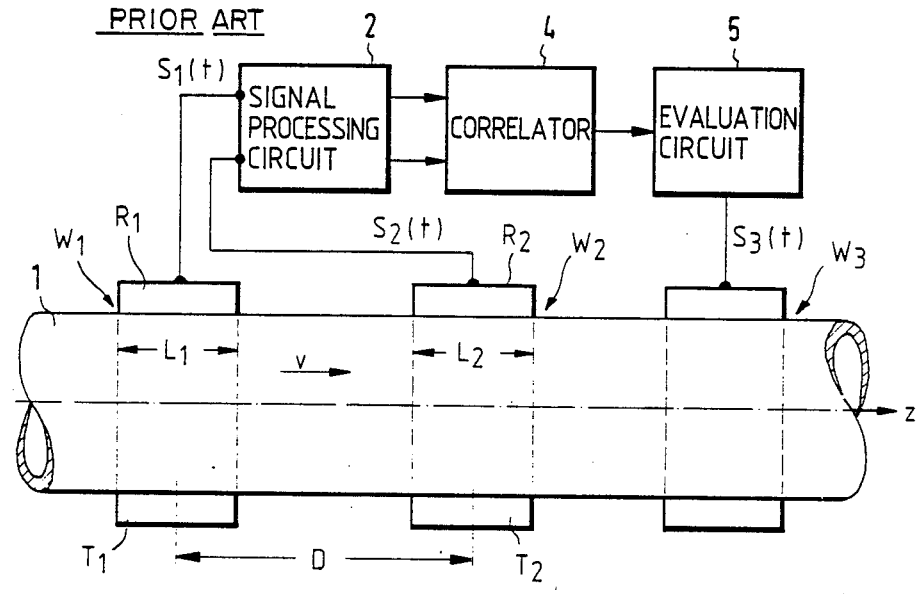

United States Patent [19]

Schneider et al.

[11] Patent Number: 4,976,154

[45] Date of Patent: * Dec. 11, 1990

[54] ARRANGEMENT FOR CONTACTLESS MEASUREMENT OF THE VOLUME FLOW OR MASS FLOW OF A MOVING MEDIUM

[75] Inventors: Georg Schneider, Schopfheim-Langenau; Hans Braun, Karlsruhe, both of Fed. Rep. of Germany

[73] Assignee: Endress u. Hauser GmbH u. Co., Fed. Rep. of Germany

[*] Notice: The portion of the term of this patent subsequent to Nov. 24, 2004 has been disclaimed.

[21] Appl. No.: 81,985

[22] Filed: Aug. 5, 1987

Related U.S. Application Data

[63] Continuation-in-part of Ser. No. 825,077, Jan. 31, 1986, Pat. No. 4,708,021.

[30] Foreign Application Priority Data

Aug. 11, 1986 [DE] Fed. Rep. of Germany ....... 3627162

[51] Int. Cl.[5] ................................................ G01P 5/22
[52] U.S. Cl. .................................. 73/861.06; 364/510
[58] Field of Search ..................... 73/861.06; 364/510

[56] References Cited

U.S. PATENT DOCUMENTS

| | | | |
|---|---|---|---|
| 3,635,082 | 1/1972 | Prellwitz et al. | 73/861.06 |
| 3,762,221 | 10/1973 | Coulthard . | |
| 3,845,660 | 11/1974 | McDonnell | 73/861.06 |
| 4,019,038 | 4/1977 | Critten et al. . | |
| 4,604,904 | 8/1986 | Massen . | |
| 4,708,021 | 11/1987 | Braun et al. | 73/861.06 |
| 4,752,727 | 6/1988 | Schneider . | |

FOREIGN PATENT DOCUMENTS

| | | |
|---|---|---|
| 2401322 | 7/1975 | Fed. Rep. of Germany . |
| 3235750 | 3/1984 | Fed. Rep. of Germany . |
| WO84/01223 | 3/1984 | PCT Int'l Appl. . |

Primary Examiner—Herbert Goldstein
Attorney, Agent, or Firm—Barnes & Thornburg

[57] ABSTRACT

The arrangement for contactless measurement of the volume flow or mass flow of a moving medium comprises two transducers which furnish electrical signals into which inhomogeneities of the moving medium enter depending on their spatial position in accordance with different spatial weighting functions. The detecting regions of the two transducers are offset with respect to each other in the direction of movement of the medium but partially overlap in such a manner that the gradient of the spatial cross correlation function for the spatial displacement zero is different from the zero vector. A correlator forms the time cross correlation function of the two signals and an evaluation circuit derives the measured value for the volume flow or mass flow of the moving medium from the gradient of the time cross correlation function for the time displacement zero. Alternatively, the measured value may also be derived from the first moment of the cross power density spectrum of the two signals because said moment is mathematically equivalent to the gradient of the time cross correlation function of the two signals for the time displacement zero.

9 Claims, 8 Drawing Sheets

FIG. 4
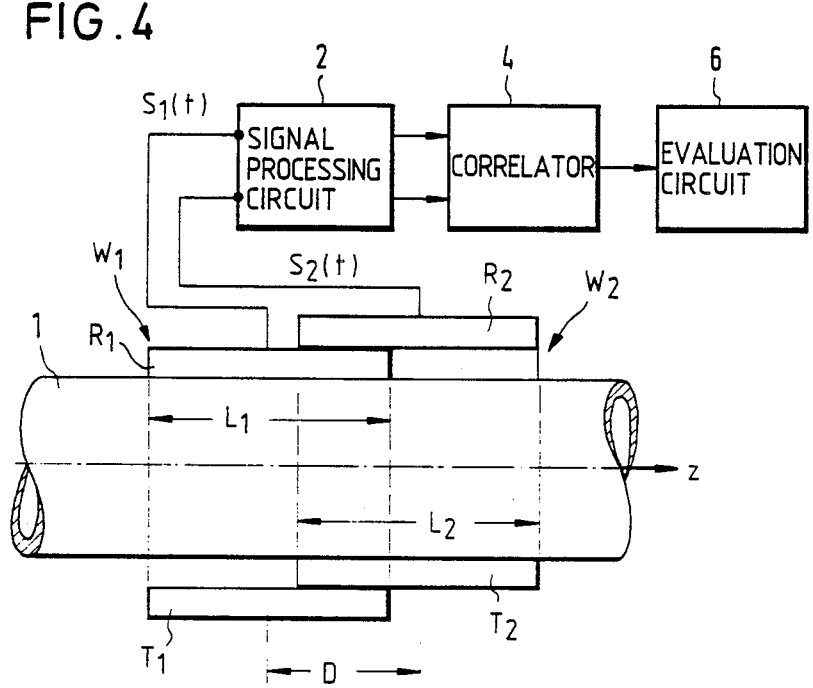
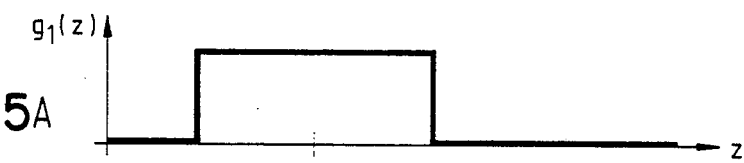
FIG. 5A
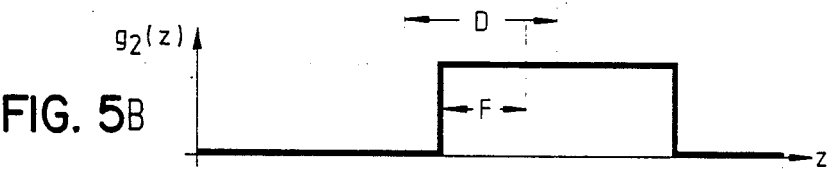
FIG. 5B
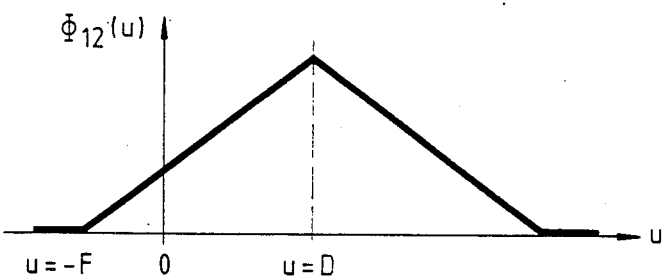
FIG. 5C

ARRANGEMENT FOR CONTACTLESS MEASUREMENT OF THE VOLUME FLOW OR MASS FLOW OF A MOVING MEDIUM

This application is a continuation-in-part of copending application Ser. No. 825,077 filed Jan. 31, 1986, now U.S. Pat. No. 4,708,021.

The invention relates to an arrangement for the contactless measurement of the volume flow or mass flow of a moving medium comprising two transducers, the detection regions of which are offset with respect to each other in the direction of movement of the medium and which furnish electrical signals into which inhomogeneities of the moving medium enter depending on their spatial position in accordance with different spatial weighting functions, and a means for recovering the measured value by correlative linking of the two signals.

In known measuring arrangements of this type the displacement time corresponding to the maximum of the time correlation function of the output signals of the two transducers is determined and is equal to the traveltime of the inhomogeneities of the medium from the first to the second transducer. When the distance between the transducers is known the velocity to be measured can be derived from the travelling time. By multiplication of the velocity value by a signal value corresponding to the instantaneous volume charge the volume flow measured value is obtained. A further multiplication of the volume flow measured value by the density of the medium gives the mass flow. This measuring method involves uncertainties in many uses because the measured result depends on the flow profile and because the maximum of the cross correlation function is often not very pronounced so that the location of the maximum cannot be exactly determined. Other contactless measuring methods do not permit the flow direction to be detected and do not give any useful indication for zero velocity and for very small velocities. Finally, the determination of the volume flow or mass flow from the velocity with the aid of additional volume charge information is complicated and a further cause of measuring errors.

The problem underlying the invention is to provide a measuring arrangement of the type set forth at the beginning which determines directly the measured value of the volume flow or mass flow and which for all velocities supplies an accurate measured result independent of the flow profile and the measuring range of which also covers zero velocity, very small velocities and reversal of the direction of movement.

According to the invention this problem is solved in that the detection regions of the two transducers partially overlap in such a manner that the gradient of the spatial cross correlation function of the spatial weighting functions for the spatial displacement zero is different from the zero vector and that the measured value is derived from the gradient of the time cross correlation function of the two signals for the time displacement zero or from the first moment of the cross power density spectrum of the two signals.

The invention is based on the recognition that under certain conditions the slope of the time cross correlation function for the time displacement zero is a measure of the volume flow or mass flow of the moving medium. Since this measured value is determined for the time displacement zero it originates from inhomogeneities disposed at the same location. This eliminates major causes of inaccuracies in the measurement. Furthermore, the contactless correlative measurement of the volume flow or mass flow is possible also in cases in which the velocity measurement based on the determination of the maximum of the cross correlation function fails. In particular, it is possible to dispense with runup distances and for example dispose a measuring point directly behind a bend. The measuring range is fundamentally not restricted and in particular includes very slow movements, stationary states and reversal of the direction of movement.

A requirement for the application of this measuring principle is that transducers are used which generate a signal pair in which a non-vanishing gradient exists in the statistical dependence of the two signals not displaced in time. This condition is fulfilled if the detection regions of the two transducers partially overlap in such a manner that the gradient of the spatial cross correlation function of the spatial weighting functions for the spatial displacement zero is different from the zero vector. This definition is an invariable geometric characteristic which depends on the configuration of the transducers and is a distinguishing feature of any transducer pair. Furthermore, the transducers must be so constructed that the signal power of the signals furnished by them depends on the volume charge. This is however the case practically with all transducers with which the previously indicated requirement of generating partially overlapping detection regions can be fulfilled.

The gradient of the time cross correlation function of two signals for the time displacement zero is mathematically equivalent to the first moment of the cross power density spectrum of said signals. There is thus no difference whether the one or the other value is calculated Advantageous embodiments and further developments of the invention are characterized in the subsidiary claims.

Figure 2A:
Figure 2B:
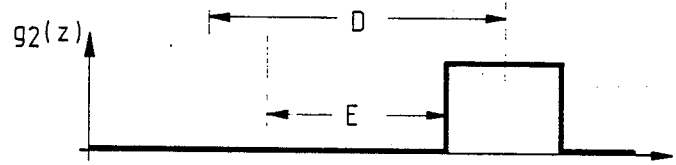
Figure 2C:
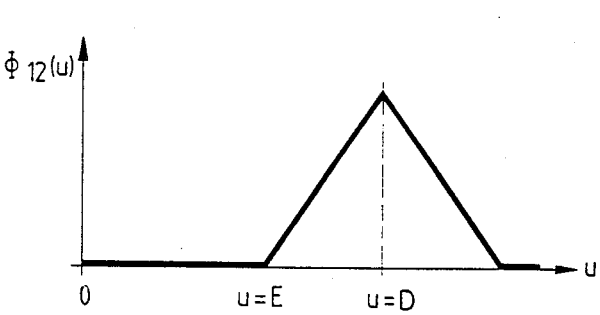
Figure 3A:
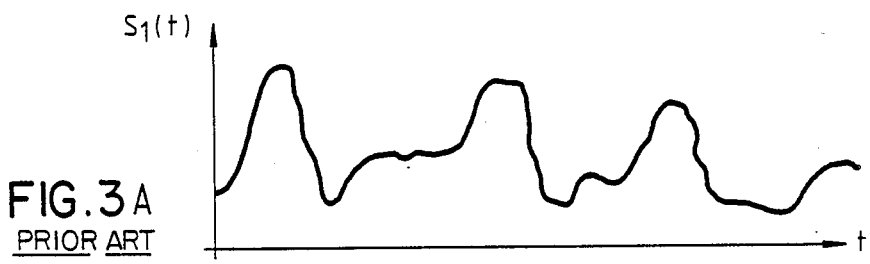
Figure 3B:
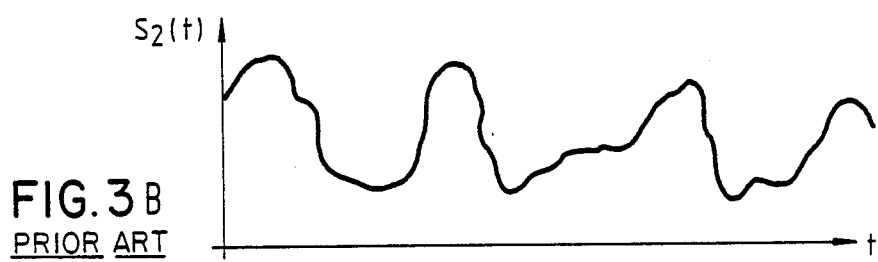
Figure 3C:
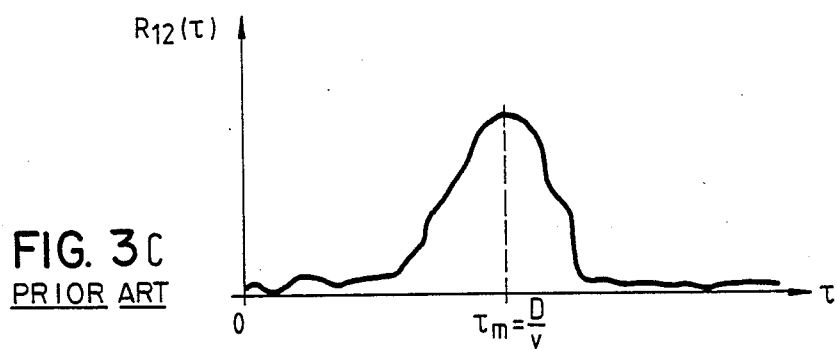
Figure 6A:
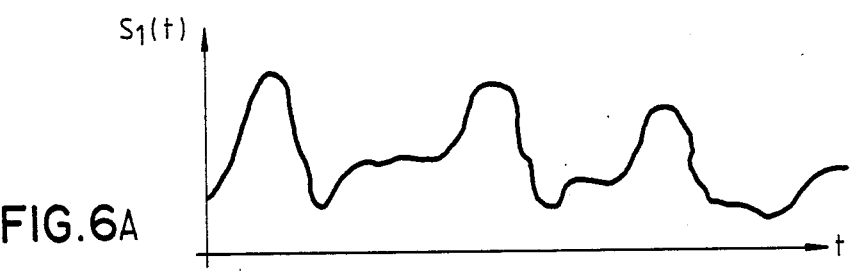
Figure 6B:
Figure 6C:
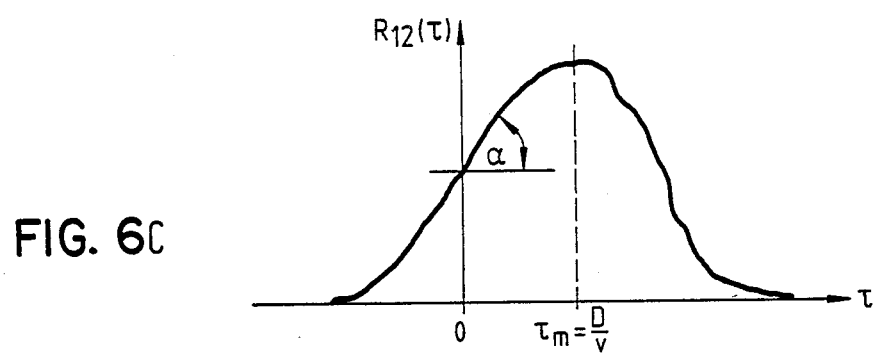
Figure 7:
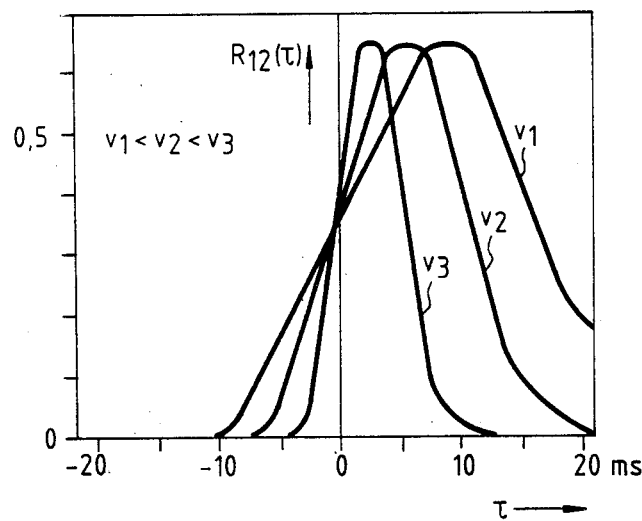
Figure 8:
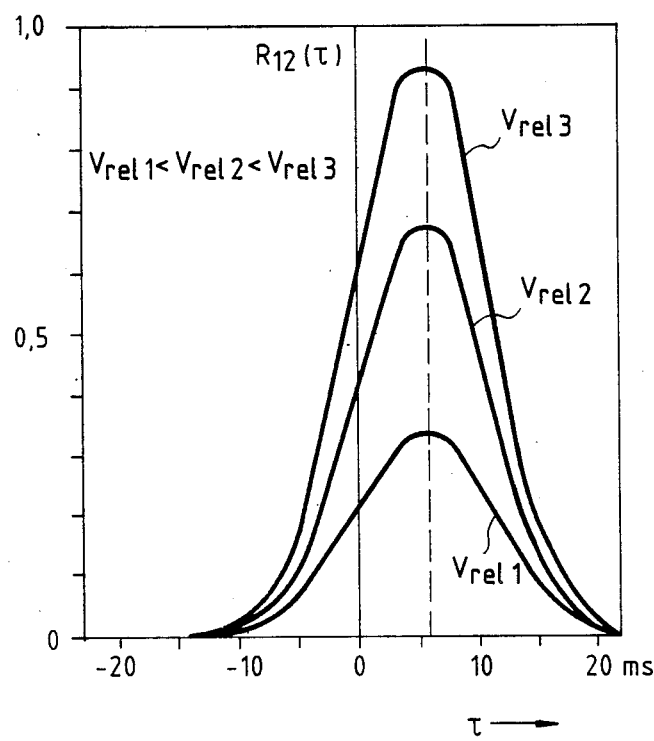
Figures 9, 10:
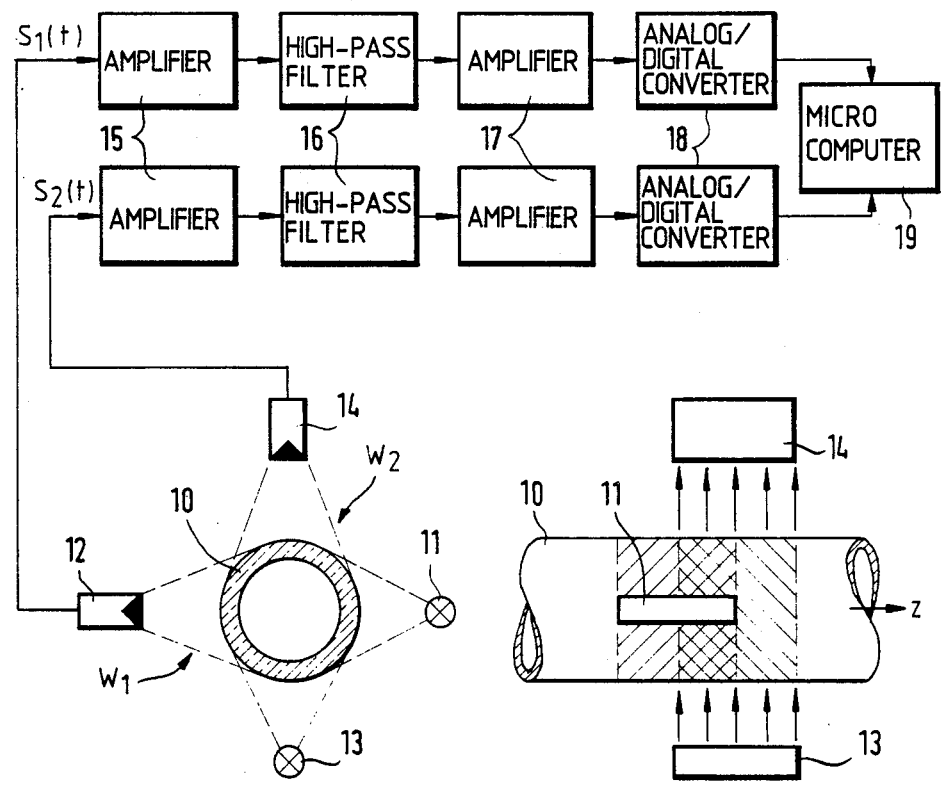
Figure 11:
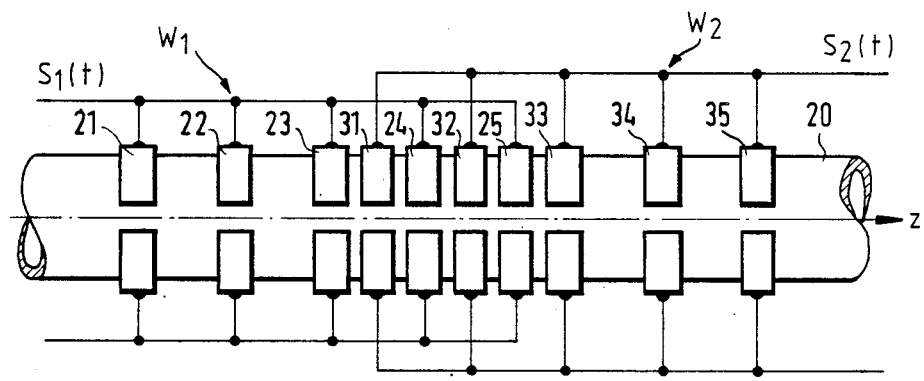
Figure 12:
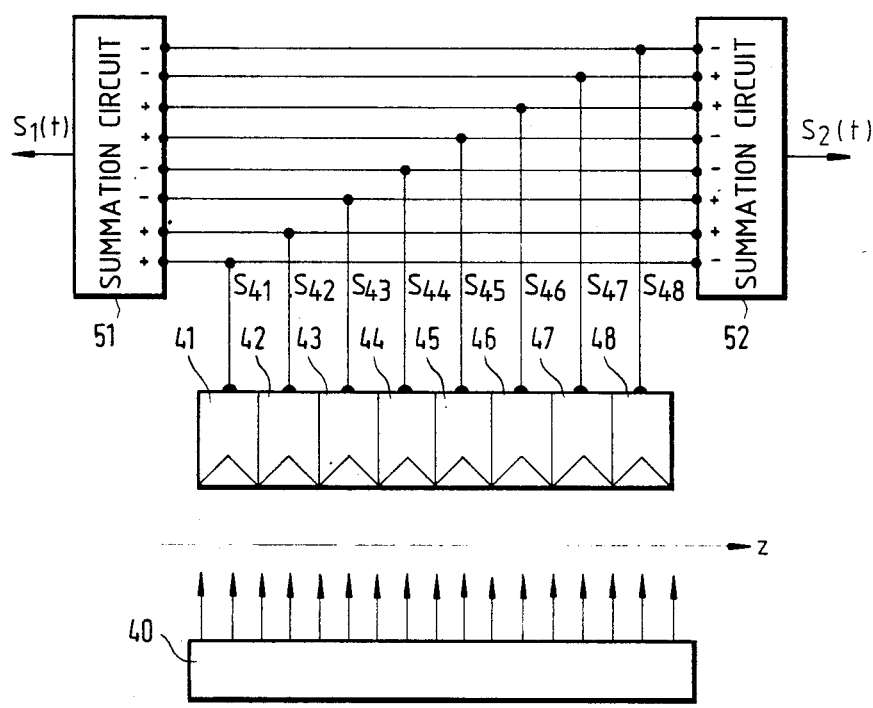
Figure 13:
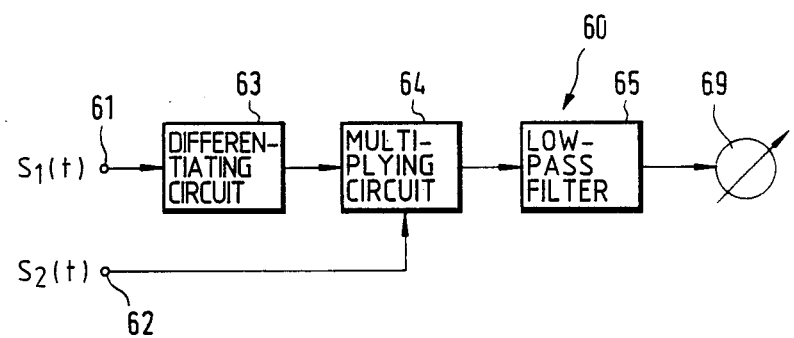

Further features and advantages of the invention will be apparent from the following description of examples of embodiment which are illustrated in the drawings, wherein:

FIG. 1 is a schematic representation of a measuring arrangement of known type for contactless correlative, measurement of the volume flow or mass flow in a pipe, FIGS. 2A–2C show diagrams of spatial functions which are characteristic of the structure of the measuring arrangement of FIG. 1, FIGS. 3A–3C shows diagrams of time functions which are characteristic of the mode of operation of the measuring arrangement of FIG. 1, FIG. 4 shows a modified embodiment of the measuring arrangement of FIG. 1 incorporating the principle of the invention, FIGS. 5A–5C represents the diagrams corresponding to FIG. 2 of spatial functions for the measuring arrangement of FIG. 4, FIGS. 6–6C represents the diagrams of time functions corresponding to FIG. 3 for the measuring arrangement of FIG. 4, FIG. 7 shows several time cross correlation functions taken with the same measuring arrangement according to the invention for various velocities at constant volume charge, FIG. 8 shows a plurality of time cross correlation functions taken with the same measuring arrangement according to the invention for various volume charges at constant velocity, FIG. 9 is an optical measuring arrangement according to the invention, FIG. 10 is a side view of the optical measuring arrangement of FIG. 9, FIG. 11 is a capacitive measuring arrangement according to the invention, FIG. 12 is an optical measuring arrangement according to the invention with a photodiode array, FIG. 13 is an analog signal processing circuit for recovering the measured value in a measuring arrangement according to the invention FIG. 1 shows for better understanding a conventional measuring arrangement, based on the principle of correlative contactless velocity measurement, for measuring the volume flow or mass flow of a medium moving with the velocity v through a pipe 1 in the direction of the pipe axis z. Disposed at the pipe 1 at an exactly known centre spacing D are two transducers $W_1$ and $W_2$ which furnish electrical signals $S_1(t)$ and $S_2(t)$ respectively which are influenced by inhomogeneities of the moving medium. Depending on the nature and consistency of the moving medium the useful inhomogeneities may be of a very different type but their effect is always based on the fact that they influence or generate either an acoustic or an electromagnetic field. For the methods working with electromagnetic fields the entire spectrum of the electrostatic field through the high-frequency and microwave range and the optical range up to $\gamma$ radiation can be employed In the case of acoustic fields the useful frequency range ranges from a few kilohertz in gases up to 10 MHz or more for liquid carrier media Generally, each transducer consists of a transmitter which generates the field to be influenced by the inhomogeneities of the medium and a receiver which responds to the field influenced by the inhomogeneities and furnishes an electrical signal representing the time variations of the field. Thus, in FIG. 1 the transducer $W_1$ consists of a transmitter $T_1$ and a receiver $R_1$ and the transducer $W_2$ consists of a transmitter $T_2$ and a receiver $R_2$. The construction of the transmitters and receivers in accordance with the nature of the field utilized is known to the expert. Thus, when using an electrical field lying in the optical range each transmitter may be a light source and each receiver a photodetector. When using an acoustic field lying in the ultrasonic range each transmitter is an ultrasonic generator and each receiver an ultrasonic detector. Capacitive sensors form at the same time transmitters and receivers for electrostatic fields, etc.

When the inhomogeneities are active and themselves generate a useful field the transmitters may be omitted so that each transducer consists only of a receiver. This is for example the case when the inhomogeneities are formed by radioactive particles whose radiation is picked up by the receivers of the transducers and converted to an electrical signal.

In accordance with a predetermined spatial weighting function each inhomogeneity of the moving medium is incorporated into the output signal of a transducer when said inhomogeneity is in the detection region thereof. In the example of embodiment of FIG. 1 the detection region of the transducer $W_1$ is a measurement volume which in the direction of the z axis has the length $L_1$ and perpendicularly to the z axis has the cross-section of the pipe 1 or a portion of said cross-section covered by the transducer. In the same manner the detection region of the transducer $W_2$ is a measurement volume having the length $L_2$ and a corresponding crosssection. Since generally the aim is to detect the velocity averaged over the pipe crosssection the transducers are constructed as far as possible to implement a uniform weighting of the pipe cross-section The diagram A of FIG. 2 shows in ideal representation as function of the coordinate z the spatial weighting function $g_1(z)$ of the transducer $W_1$, i.e. the effect of a punctiform inhomogeneity on the output signal of the transducer $W_1$ in dependence upon its spatial position along the z axis. If the punctiform inhomogeneity is disposed outside the detection region of the transducer $W_1$ it does not enter the output signal $S_1(t)$ and the spatial weighting function $g_1(z)$ has the value 0. When the punctiform inhomogeneity is disposed in the detection region of the transducer $W_1$ however it enters the output signal $S_1(t)$ with a predetermined value different from zero so that the spatial weighting function $g_1(z)$ assumes a value different from zero for the entire detection region.

In corresponding manner the diagram B of FIG. 2 shows the spatial weighting function $g_2(z)$ of the transducer $W_2$. If the two transducers $W_1$ and $W_2$ are made the same the spatial weighting function $g_2(z)$ has the same curve form as the spatial weighting function $g_1(z)$ but differs therefrom in its different position with respect to the abscissa axis z. Corresponding to the arrangement of the transducers in FIG. 1 the spatial weighting functions $g_1(z)$ and $g_2(z)$ are offset with respect to each other by the amount D and between them there is a gap of magnitude E.

The diagram C of FIG. 2 shows the spatial cross correlation function $\Phi_{12}(u)$ of the spatial weighting functions $g_1(z)$ and $g_2(z)$. The spatial cross correlation function has the mathematical form $$\Phi_{12}(u) = \int_{-\infty}^{+\infty} g_2(z) g_1(z + u) dz \qquad (1)$$

This means that the values of the weighting function $g_2(z)$ are multiplied by the values of the spatial weighting function $g_1(z)$ displaced by a spatial displacement u and the mean value of the products is formed over the region Z evaluated. For each value of the spatial displacement u a discrete value of the spatial correlation function is obtained. The spatial displacement $z=0$ corresponds to the starting position illustrated in diagrams A and B of the spatial weighting functions, i.e. the spatial location of the transducer $W_1$ and $W_2$ of FIG. 2, and increasing values of u correspond to a reduction of the mutual offsetting of the mutually correlated values of the two spatial weighting functions. For $u=0$ the cross correlation function has the value zero because always at least one of the two values of each value pair multiplied together is zero. At $u=E$ the mutual overlapping of the portions of the two weighting functions different from zero begins and the cross correlation function increases For $u=D$ the two weighting functions $g_1(z)$ and $g_2(z)$ are congruent and the spatial cross correlation function reaches its maximum.

Both the spatial weighting functions $g_1(z)$, $g_2(z)$ and their cross correlation function $\Phi_{12}(u)$ are invariable characteristics of the transducers $W_1$ and $W_2$ which depend on the geometry of the transducers and thus suitable for characterizing said transducers.

This characterization of the transducers by the spatial weighting functions and the spatial cross correlation function is not restricted to the case where the detection region of each transducer is a measurement volume. It also applies to the case where the inhomogeneities utilized for the measurement of the velocity are disposed at the surface of the moving medium and the transducers each detect a predetermined surface area of the medium. This is for example the case in the measurement of the velocity of paper webs, textile webs and metal sheets in rolling mill trains. The detection region of each transducer is then not a volume but a surface region. The observations made above on the spatial weighting functions and their spatial correlation function apply without qualification to this case as well.

The diagrams A and B of FIG. 3 shows the time variation of the output signals $S_1(t)$ and $S_2(t)$ of the transducers $W_1$, $W_2$. The fluctuations of these signals originate from the inhomogeneities of the moving medium passing through the detection regions of the transducers. Assuming that these inhomogeneities at least partially continue to exist on the path from the first to the second transducer, the fluctuations of the output signals of the two transducers caused by them have certain similarities which are offset with respect to each other by an interval of time which is equal to the travelling time of the inhomogeneity from the first to the second transducer. This fact is utilized for the velocity measurement by correlative linking of the two signals.

The diagram C of FIG. 3 shows the time cross correlation function $R_{12}(\tau)$ of the two signals $S_1(t)$ and $S_2(t)$. The time cross correlation function has the mathematical form $$R_{12}(\tau) = \lim_{T \to \infty} \frac{1}{T} \int_0^T S_2(t) S_1(t + \tau) dt \quad (2)$$

This means that the instantaneous values of the signals $S_2(t)$ are multiplied by the instantaneous values of the signal $S_1(t)$ displaced by a displacement time $\tau$ and the mean value of the products is formed over the region of the observation time T. For each value of $\tau$ a discrete value of the time cross correlation function is obtained In the use considered the cross correlation function has a maximum at a predetermined displacement time $\tau_m$ which is equal to the travelling time of the inhomogeneities of the medium from the transducer $W_1$ to the transducer $W_2$, i.e. when the following applies:

$$\tau_m = \frac{D}{v} \quad (3)$$

With a known distance D from the displacement time $\tau_m$ the velocity v of the inhomogeneities can be directly calculated and as a rule is equal to the velocity of the medium For determining the cross correlation function the signals $S_1(t)$ and $S_2(t)$ are supplied after the necessary pretreatment in a signal processing circuit to a correlator 4. An evaluation circuit 5 connected to the correlator 4 investigates the cross correlation function for a maximum and determines the displacement time $\tau_m$ from which the velocity v can be calculated. Preferably, a suitably programmed microcomputer performs the functions of the correlator 4 and the evaluation circuit 5. In this case the signal processing circuit 2 includes an analog/digital converter which converts the analog output signals $S_1(t)$ and $S_2(t)$ to digital signals which are suitable for processing in the microcomputer.

If only the velocity v is to be measured the evaluation circuit 5 can display the velocity measured value simply on the basis of the correlation of the signals $S_1(t)$ and $S_2(t)$. If however the volume flow or mass flow of the medium flowing through the pipe 1 is to be measured the evaluation circuit 5 requires in addition to the velocity information also information on the volume charge (volume density) $V_{rel}$, i.e. on the relative proportion of the volume $V_M$ of the transported medium in the transport volume $V_T$:

$$V_{rel} = \frac{V_M}{V_T} \quad (4)$$

When the volume charge $V_{rel}$ is known the volume flow $\dot{V}$, i.e. the volume of the moving medium transported per unit time, is obtained from the following relationship:

$$\dot{V} = \frac{dV}{dt} = V_{rel} \cdot V_T \cdot v \left[ \text{e.g.} \frac{m^3}{min}, \frac{1}{sec} \text{ etc.} \right] \quad (5)$$

The mass flow $\dot{m}$ of the moving medium, i.e. the medium mass transported per unit time, is then equal to the product of the volume flow $\dot{V}$ and the density $\rho$ of the transported medium:

$$\dot{m} = \frac{dm}{dt} = \dot{V} \cdot \rho \left[ \text{e.g.} \frac{kg}{h} \right] \quad (6)$$

To determine the volume charge in the measuring arrangement of FIG. 1 to the pipe 1 a third transducer $W_3$ is attached which supplies a signal $S_3(t)$ which depends on the volume charge The evaluation circuit 5 can then calculate from the velocity v determined and from the information contained in the signal $S_3(t)$ on the volume charge $V_{rel}$ in accordance with the above equations (5) and (6) the volume flow $\dot{V}$ and/or the mass flow $\dot{m}$ and provide the desired measured value. If the transducers $W_1$ and $W_2$ are made so that their output signals depend on the volume charge the transducer $W_3$ can be dispensed with and instead the output signal of one of the transducers $W_1$, $W_2$ supplied to the evaluation circuit 5.

FIG. 4 shows in a schematic representation corresponding to FIG. 1 a correlative measuring arrangement which embodies the principle on which the invention is based. For the components and dimensions corresponding to the arrangement of FIG. 1 the same designations as in said Figure are used. An essential difference compared with the arrangement of FIG. 1 is that the detection regions of the two transducers $W_1$ and $W_2$ partially overlap. This must be achieved by a corresponding configuration of the transducers as indicated in the schematic representation of FIG. 4 by the transmitters $T_1$, $T_2$ and the receivers $R_1$, $R_2$ of the two transducers also partially mutually overlapping. Furthermore, in the measuring arrangement of FIG. 4 the transducer $W_3$ or the corresponding connection of one of the transducers $W_1$, $W_2$ to the evaluation circuit is not present.

The partial overlapping of the detection regions of the transducers $W_1$, $W_2$ results in that the spatial weighting functions $g_1(z)$ and $g_2(z)$ illustrated in the diagrams A and B of FIG. 5 also partially overlap by an amount F. Accordingly, the spatial cross correlation function $\Phi_{12}(u)$ illustrated in diagram C of FIG. 5 has for the spatial displacement $u=0$ a value different from zero and a gradient different from the zero vector. The spatial cross correlation function assumes the value zero only at a negative spatial displacement $u=-F$ and reaches it maximum at the positive spatial displacement $u=D$.

The diagrams A and B of FIG. 6 again show the time variation of the signals $S_1(t)$ and $S_2(t)$ which are emitted by the transducers $W_1$ and $W_2$ respectively of FIG. 4. These signals have fundamentally the same properties as the signals $S_1(t)$, $S_2(t)$ illustrated in FIG. 3 of the measuring arrangement of FIG. 1.

In contrast, the time cross correlation function $R_{12}(\tau)$ illustrated in diagram C of FIG. 6 for the signals $S_1(t)$ and $S_2(t)$ differs from that of diagram C of FIG. 3 in that at the displacement time $\tau=0$ it has a value different from zero and a gradient different from zero which is represented by the angle $\alpha$ between the tangent to the time cross correlation function at the intersection with the coordinate axis drawn in the point $\tau=0$ and the horizontal. The maximum of the time cross correlation function again lies at the displacement time $\tau_m = D/v$ and could, as in the arrangement of FIG. 1, be used for measuring the velocity of the moving medium, from which with the aid of additional information on the volume charge the measured value of the volume flow and/or the mass flow could be derived. However, the particular feature of the measuring arrangement of FIG. 4 resides in that the measured value of the volume or mass flow is derived from the gradient of the time cross correlation function for the displacement time $\tau=0$.

This measure is based on the recognition that a unique mathematically definable relationship exists between the gradient of the time cross correlation function at the displacement time $\tau=0$ and the instantaneous volume flow or mass flow of the medium. FIG. 7 shows the time cross correlation functions determined with the same measuring arrangement for various velocities $v_1$, $v_2$, $v_3$ of the medium at constant volume charge As can be seen, all the cross correlation functions intersect the ordinate axis passing through $\tau=0$ at the same point but with different gradients The gradient is the greater the greater the velocity. To illustrate this, it may be stated that for velocity changes the cross correlation function expands and contracts like an accordion Since according to equation (5) the volume flow $\dot{V}$ at constant volume charge $V_{rel}$ is proportional to the velocity v, in the diagram of FIG. 7 the slope of the time cross correlation function at time displacement zero is a measure of the volume flow and, if the density $\rho$ of the medium is known, in accordance with equation (6) also a measure of the mass flow.

In corresponding manner FIG. 8 shows the time cross correlation functions determined with the same measuring arrangement for various volume charges at constant velocity In this case the maxima of all the cross correlation functions lie at the same displacement time $\tau$, which corresponds to the constant velocity but an increase in the values of the cross correlation function proportional to the volume charge takes place Accordingly, all the cross correlation functions intersect the ordinate axis passing through $\tau=0$, again with different slopes but this time not at the same point The slope is the greater the greater the volume charge Since in accordance with equation (5) the volume $\dot{V}$ at constant velocity v is proportional to the volume charge $V_{rel}$, in this case as well the slope of the time cross correlation function for the time displacement zero is a measure of the volume flow and of the mass flow. The same relationship between the slope of the time cross correlation function and the displacement time $\tau=0$ and the volume flow or mass flow also exists when the velocity and the volume charge vary simultaneously. In every case the measured value of the volume flow and/or mass flow can be derived directly from the slope of the time cross correlation function for the time displacement zero.

The mathematical relationship between the mass flow $\dot{m}$ and the slope or gradient of the time cross correlation function is given by the following equation:

$$\dot{m} = \frac{\Phi_{12}(0)}{\frac{d}{du}\Phi_{12}|_{u=0}} \cdot \dot{R}_{12}(0) \cdot K \quad (7)$$

wherein:

$101_{12}(O)$: is the value of the spatial cross correlation function for the spatial displacement $u=0$;

$$\frac{d}{du}\Phi_{12}|_{u=0}:$$

is the gradient of the spatial cross correlation function for the spatial displacement $u=0$;

$\dot{R}_{12}(O)$: is the gradient of the time cross correlation function for the displacement time $\tau=0$;

K: calibration factor (takes account of the density of the medium).

The first factor on the right side of equation (7) is a geometrical term to be determined once which as was explained with reference to FIGS. 4 and 5 depends on the structure and arrangement of the transducers The second factor expresses the gradient of the time cross correlation function, for the time displacement zero. The calibration factor K is a factor which has to be determined once and depends on the density of the transported medium.

Equation (7) also applies to the determination of the volume flow but with the difference that the calibration factor K is then not dependent on the density of the medium.

As apparent from equation (7) to determine the mass flow and/or the volume flow no additional information dependent on the volume charge is necessary if the measured value is derived directly from the slope of the time cross correlation function for the time displacement zero and not, as in the measuring arrangement of FIG. 1, from the previously measured velocity This is because the charge information contained in the signals $S_1(t)$ and $S_2(t)$ furnished by the transducers $W_1$ and $W_2$ respectively of the measuring arrangement of FIG. 4 is automatically incorporated into the calculation.

An essential requirement for the function of the measuring arrangement described is that the signal power of the signals furnished by the transducers is proportional to the volume charge This is however in wide ranges the case with all transducers with which the partial overlapping of the detection regions can be realized as shown diagrammatically in FIG. 4, independently of the type of the transducers (optical, acoustic, electromagnetic, capacitive, etc.).

A further requirement for the mode of operation indicated is that the signal power, i.e. the amplitude information, must not be lost in the signal processing and the correlation. The correlation in the correlator 4 must thus not be carried out with "clipped" signals or pure sign signals. With a purely analog signal processing this condition is usually fulfilled. With digital signal processing the amplitude information must be converted with sufficient resolution (bit position number) to the digital code words.

It is apparent from equation (7) that the gradient of the spatial cross correlation function must not vanish because it is in the denominator. This condition is only fulfilled if the detection regions of the transducers overlap in the manner explained with reference to FIGS. 4 and 5.

To determine the gradient of the time cross correlation function in the measuring arrangement of FIG. 4 the output signals $S_1(t)$ and $S_2(t)$ are supplied again after pretreatment in a signal processing circuit 2 to a correlator 4 which calculates the time cross correlation function However, an evaluation circuit 6 is now associated with the correlator 4 which determines the gradient of the time cross correlation function for the displacement time $\tau=0$ and derives therefrom the velocity flow or mass flow of the medium. The correlator 4 and the evaluation circuit 6 may of course be formed in this case as well by a suitably programmed microcomputer.

There are numerous possibilities of constructing the transducers so that their detection regions overlap. FIGS. 9 and 10 show as example an optical measuring arrangement for measuring the flow velocity of a medium flowing through a plexiglass tube 10. The transducer $W_1$ includes as transmitter a light source 11 and as receiver a photodiode 12. The transducer $W_2$ includes as transmitter a light source 13 and as receiver a photodiode 14. Each transducer is so constructed that taking account of the lens action of the plexiglass tube 10 a substantially homogeneous weighting of the tube cross-section is achieved The optical axes of the two transducers are arranged at a right angle. As FIG. 10 shows the light sources 11, 13 and the photodiodes 12, 14 of the two transducers are somewhat offset with respect to each other along the tube axis z so that the detection regions of the two transducers overlap by about half. For clarification the extent of the light sources 11, 13 and the photodiodes 12, 14 in the direction of the tube axis z has been shown exaggerated in FIG. 10 The overlapping of the detection regions is made possible in this case by the crossed arrangement of the transducers.

FIG. 9 also shows the configuration of the two signal processing circuits to which the output signals $S_1(t)$ and $S_2(t)$ of the transducers $W_1$ and $W_2$ are supplied. In each signal processing circuit the output signal of the associated transducer is first amplified in a preamplifier 15 and then filtered in a high-pass filter 16, the mean value of the signal being suppressed After again amplifying in an amplifier 17 each signal is supplied to an analog/digital converter 18 which converts the mean-value-free analog signal to a digital signal suitable for processing in the microcomputer. Connected to the analog/digital converter 18 is a microcomputer 19 which performs the functions of the correlator 4 and the evaluation circuit 6 of FIG. 4.

Another possibility for implementing partially overlapping detection regions is for each transducer to consist of a plurality of transducer elements which are nested with the transducer elements of the other transducer. FIG. 11 shows as example of this a measuring arrangement with capacitive transducers for measuring the volume flow and/or mass flow of a medium flowing through a tube 20. The transducer $W_1$ consists of five transducer elements 21, 22, 23, 24, 25, each of which is formed in the usual manner by two electrodes diagrammatically opposite each other at the periphery of the tube 20. The transducer elements 21, 22, 23, 24, 25 are arranged along the tube axis at intervals so that there are gaps between them The transducer $W_2$ consists in the same manner of five transducer elements 31, 32, 33, 34, 35 which are arranged along the tube axis at intervals so that there are gaps between them. The transducer elements 31 and 32 of the transducer $W_2$ lie in the gaps between the transducer elements 23 and 24 and 24 and 25 respectively of the transducer $W_1$, thus giving the desired overlapping of the detection regions of the two transducers $W_1$ and $W_2$.

Instead of equipping each of the two transducers with their own transducer elements it is alternatively possible to combine the output signals of the same transducer elements in different manner in order to implement overlapping detection regions of two transducers. FIG. 12 shows a measuring arrangement comprising an array of photodiodes 41, 42, 43, 44, 45, 46, 47, 48 which are arranged along the movement direction z of the moving medium and receive the light of a common light source 40 Each photodiode forms in conjunction with the light source a transducer element and emits an electrical output signal $S_{41}, S_{42} \ldots S_{48}$ influenced by the inhomogeneities of the moving medium. the outputs of the photodiodes are connected to the inputs of two summation circuits 51 and 52 which combine the output signals of the photodiodes for forming the two signals $S_1(t)$ and $S_2(t)$ to be correlated with different sign rating. For example, the signals $S_1(t)$ and $S_2(t)$ are formed in the following manner:

$$S_1(t) = +S_{41} + S_{42} - S_{43} - S_{44} + S_{45} + S_{46} - S_{47} - S_{48}$$

$$S_2(t) = -S_{41} + S_{42} + S_{43} - S_{44} - S_{45} + S_{46} + S_{47} - S_{48}$$

This implementation of the overlapping detecting regions has the advantage that the signals $S_1(t)$ and $S_2(t)$ are free from mean values so that there is no necessity for a high-pass filtering. Furthermore, the effect of concentration fluctuations on the measurement result is suppressed. Of course, the same procedure may be adopted with acoustic, capacitive or other transducer elements instead of photodiodes.

Instead of the signal logic linking simultaneously with two summation circuits it can also be done in time multiplex with the same summation circuit.

The signals $S_1(t)$ and $S_2(t)$ obtained with the arrangements of FIG. 11 or FIG. 12 may then be further processed in the manner previously explained to form the time cross correlation function whose gradient is to be determined for the displacement time $\tau=0$ and to derive therefrom the measured value of the volume flow and/or mass flow.

Instead of carrying out these operations in a microcomputer it is also possible to obtain the result by direct processing of the electrical signals in a hardware circuit.

FIG. 13 shows an analog signal processing circuit 60 which is suitable for this purpose and comprises two inputs 61 and 62 to which are respectively supplied the output signals $S_1(t)$ and $S_2(t)$ of one of the previously described transducer systems The analog signal $S_1(t)$ supplied to the input 61 is differentiated in a differentiating circuit 63 with respect to time. The output of the differentiating circuit 63 is connected to the one input of a multiplying circuit 64 which receives the signal $S_2(t)$ at the other input. The output signal of the multiplying circuit 64 is supplied via a low-pass filter 65 to a display device 69.

The multiplication of the signals in the multiplying circuit 64 corresponds to the formation of the cross correlation function for the displacement time $\tau=0$, the result, due to the preceding differentiation of the signals $S_1(t)$, corresponding directly to the gradient of the cross correlation function. The output signal of the integrating low-pass filter 65 thus represents the gradient of the cross correlation function for the displacement time $\tau=0$ and can be employed in the display device 69 directly to display the volume flow or mass flow to be measured if the display device 69 is calibrated taking account of the corresponding calibration factor K.

The first moment of the cross correlation density spectrum of the signals $S_1(t)$ and $S_2(t)$ is mathematically equivalent to the gradient of the normalized cross correlation function for the displacement time $\tau=0$. It is therefore also possible to program the microcomputer or the hardware circuit used in its place in such a manner that a result is obtained which corresponds to the first moment of the cross power density spectrum It is then possible to derive from this value the measured value of the volume flow and/or mass flow in the same manner as from the gradient of the normalized cross correlation function for the displacement $\tau=0$.

We claim:

1. An arrangement for the contactless measurement of the mass or volume flow of inhomogeneities in a moving medium comprising two transducers having detection regions which are offset with respect to each other in the direction of movement of the medium and which generate electrical output signals influenced by the spatial position of inhomogeneities of the moving medium, the output signals generated in accordance with a spatial weighting function of each transducer, the detection regions of the two transducers partially overlapping in such a manner that the gradient of the spatial cross correlation function of the spatial weighting functions for the spatial displacement zero is different from the zero vector, means for calculating the time cross correlation function of the electrical output signals from the two transducers and for generating a first electrical signal representing the gradient of the time cross correlation function of the electrical output signals for the displacement time zero, means for processing the first electrical signal to generate a second electrical signal indicative of the mass or volume flow of the inhomogeneities in the moving medium, and means for coupling the means for generating the first electrical signal to the processing means.

2. The arrangement according to claim 1, wherein the processing means includes means for setting a selected calibration factor related to the density of the inhomogeneities in the moving medium and means for modifying the first electrical signal based on the value of the calibration factor to generate the second electrical signal indicative of the mass of volume flow rate of the inhomogeneities.

3. The arrangement according to claim 1, wherein the two transducers are arranged with their axes disposed at an angle and with a mutual overlapping offset with respect to each other in the direction of movement.

4. The arrangement according to claim 1, wherein each transducer comprises a plurality of transducer elements arranged along the direction of movement, the two transducers being nested in each other to produce overlapping detecting regions.

5. The arrangement according to claim 1, wherein the overlapping detecting regions of the two transducers are implemented by different combinations of the output signals of a plurality of transducer elements arranged along the direction of movement.

6. An arrangement for the contactless measurement of the volume flow, mass flow, or velocity of a moving medium comprising two transducers having detection regions which are offset with respect to each other in the direction of movement of the medium and which generate electrical output signals influenced by the spatial position of inhomogeneities of the moving medium, the output signals generated in accordance with a spatial weighting function of each transducer, the detection regions of the two transducers partially overlapping in such a manner that the gradient of the spatial cross correlation function of the spatial weighting functions for the spatial displacement zero is different from the zero vector, means for calculating the time cross correlation function of the electrical output signals from the two transducers and for generating a first electrical signal representing the gradient of the time cross correlation function of the electrical output signals for the displacement time zero, means for processing the first electrical signal to generate a second electrical signal indicative of the volume flow, mass flow, or velocity of the moving medium, and means for coupling the means for generating the first electrical signal to the processing means.

7. The arrangement according to claim 6, wherein the two transducers are arranged with their axes disposed at an angle and with a mutual overlapping offset with respect to each other in the direction of movement.

8. The arrangement according to claim 6, wherein each transducer comprises a plurality of transducer elements arranged along the direction of movement, the two transducers being nested in each other to provide overlapping detecting regions.

9. The arrangement according to claim 6, wherein the overlapping detecting regions of the two transducers are implemented by different combinations of the output signals of a plurality of transducer elements arranged along the direction of movement.

* * * * *